May 27, 1947.    R. W. LUCE    2,421,277
REFLECTIVE SIGN
Filed May 12, 1943
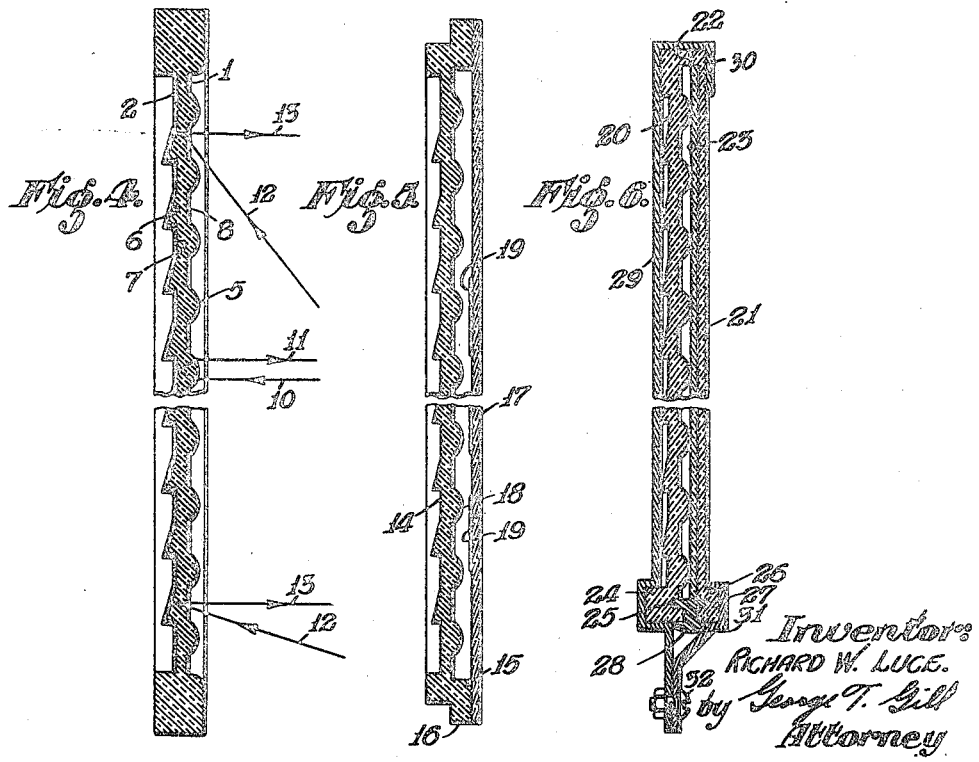
Inventor:
RICHARD W. LUCE
by George T. Gill
Attorney Patented May 27, 1947

2,421,277

UNITED STATES PATENT OFFICE 2,421,277

REFLECTIVE SIGN

Richard W. Luce, Southport, Conn.

Application May 12, 1943, Serial No. 486,713

5 Claims. (Cl. 88—82)

The invention herein disclosed relates to a light-reflecting device of a kind that is suitable for a sign. More particularly, the invention relates to a light-reflecting device having a plurality of light-directing properties.

For certain purposes, it is desirable that a sign have different directional characteristics in light reflected therefrom. An example where such a sign is desirable is for rear license plates for automobiles. The rear license plate is illuminated by the tail light which is spaced therefrom and either above or below the plate. It is highly desirable that the rear license plate be clearly legible at night, to pedestrians and to drivers of automobiles to the rear.

The principal object of this invention is to provide a light-reflecting device, usable as a sign, such as a license plate, which will provide the maximum reflected light to give greatest legibility at different positions from different light sources. In accordance with the invention there is provided a light-reflecting device having retrodirective light-reflecting characteristics and directional light-reflecting characteristic. In one specific form of the light-reflecting device different light-reflecting characteristics are produced, intermingled and arranged such that each produces the effect of total illumination of the sign though each reacts to a different light source and effect, in different directions, directional light-reflection.

A license plate, embodying the light-reflecting device of this invention is illustrated, by way of an example of one embodiment of the invention, in the accompanying drawing. This light reflecting license plate is described in detail below from which description a clearer understanding of the invention may be had.

The drawings include:

Fig. 1 which is a front elevation of a plate embodying the invention;

Fig. 2 which is an enlarged, fragmentary elevation of the same;

Fig. 3 which is an enlarged, fragmentary rear elevation of the same;

Fig. 4 which is a sectional elevation taken on the line 4—4 of Fig. 1;

Fig. 5 which is a sectional elevation of a modified form of the license plate; and Fig. 6 which is a sectional elevation of a further modification of the license plate.

The sign illustrated in the drawings is one that is especially suitable for the rear license plate of an automobile. This sign includes a light-collecting and distributing element 1 and an opaque light-reflecting material 2 at the rear of the plate having different light-absorbing characteristics. It may or may not be provided with a backing or supporting plate for re-enforcement.

The light-collecting and distributing element has both retrodirective and directive light-reflecting characteristics. The former characteristic is especially suitable for illuminating the plate and rendering it legible in the reflected beam pattern from the light of the head lamps of a car to the rear of one carrying the license plate. The latter light-reflecting characteristic is especially suitable for illuminating the plate and rendering it legible to a pedestrian at the side of a road by the light from a rear tail light such as the light 3 carried by all cars and generally required by law. In each instance, the light-reflecting characteristics are directional and, therefore, maximum illumination and legibility are obtained from the particular light source serving the observer.

The light-collecting and distributing element 1 preferably consists of a moldable, translucent material, preferably transparent. Several plastics are especially suitable in this respect, particularly the transparent plastics such as "Lucite" and "Polystyrene." The latter material has a comparatively high index of refraction, one and six tenths (1.6), and the higher the index of refraction, the lesser the over all thickness of the plate and, therefore, the lesser volume or weight of material is required for a given size plate.

The light-reflecting characteristics of the plate are obtained by forming in the plate optical elements which effect the desired collection and distribution of light. For this purpose, in the particular plate illustrated, the plate, within a reenforcing border 4, is provided with reflectors of lens-mirror type for effecting a retrodirective reflection of light falling thereon and surface reflectors for effecting a directional reflection of the light from a fixed source such as the tail light. In each instance, the optical elements for each reflective characteristic are very small, closely related and distributed over the entire area of the plate. The lens-mirror type reflectors consists of a series of rows of relatively small lenses 5 on the front surface of the plate and the directional reflectors consist of a series of prismatic or surface reflectors 6 formed on the rear surface of the plate. The rows of lenses, in the particular plate illustrated, extend along arcs of circles, the common center of which is the fixed light source, the tail lamp 3. The rows of lenses are spaced apart a distance equal to the width of the lenses.

Between each row of the lenses 5 on the front surface of the plate is a plane surface. Similarly, the surface reflectors at the rear surface of the plate are of a width equal to the width of the lenses and they are spaced apart a like amount. These surface reflectors also extend along arcs of circles, the common center of which is the center of the tail light 3 projected to the plane of the plate. Between these surface reflectors on the rear surface of the plate is a plane surface. The lenses 5 are opposite, or in front of, the rows of plane surfaces 7 on the rear of the plate and the surface reflectors 6 are opposite, or at the rear of, the rows of plane surfaces 8 on the front surface of the plate.

The plate is preferably made very thin with spherical-sector lenses of a very small radius of curvature. With lenses of a radius of curvature of three one hundred and twenty-eighths (3/128) of an inch, the thickness of the plate, when made from "Polystyrene," from a rear plane surface 7 to the apex of a lens is desirably about fifty-six thousands (0.056) of an inch. These proportions place the rear surface, behind the lenses, at the point of the greatest concentration of light by a lens from a point source at infinity, that is at what is commonly referred to as the focal point.

The lenses are, preferably, ninety degree sectors of spheres of a radius of curvature of three one hundred and twenty-eighths (3/128) of an inch. The width of a lens, and in consequence the width of a row of lenses, is equal to the diameter of the spherical sector, i. e., the chord subtending the lens, or the radius of the sphere divided by the sine of forty-five degrees, that is approximately thirty-three thousands (0.033) of an inch. The rows of lenses are spaced apart by a like amount and thus the surface reflectors have a width equal to the width of the lenses and successive reflectors are spaced apart the same amount.

The directive light-reflectors consist of plane surfaces formed at the rear of the plate and angularly related or inclined to aline the rays from the fixed light source so that the reflected light is directed as desired, and particularly such that the reflected light from the entire system forms a reflected light pattern to reach the eyes of pedestrians to the rear, and at one side of the car carrying the plate. The proper angle of each reflector is readily determined in accordance with the laws governing the reflection of light from a plane surface. It will be apparent that for a perfect system each directive reflector should have a different inclination to the light source and in some instances, to the horizontal. In the illustrated plate, the reflecting surfaces 6 are inclined to reflect light from the tail light 3 in a direction substantially normal to the plane of the plate. Thus, the reflecting surfaces 6 are normal to the bisector of the angle a ray from the tail light striking the reflecting surface makes with a perpendicular to the plane of the plate.

In this way, the light collecting and directing element or plate 1 is such that, with a suitable opaque light-reflecting medium at the rear surface thereof, it possesses over the entire area thereof, retrodirective and directive light-reflecting characteristics, and it appears fully illuminated to either a pedestrian or the driver of an approaching car. A suitable opaque light-reflecting medium is, for this sign, paint. In making a license plate such as that illustrated, numbers, represented by the numerals 9 are first painted on the rear surface. After they have dried the entire rear surface is then painted with a contrasting color paint.

The retrodirective, reflective characteristic of the lens-mirror reflecting system is indicated by the rays 10 and 11 in Fig. 4. The ray 10 represents an incident paraxial ray and the ray 11 is the reflected incident ray. In Fig. 4, the rays 12 and 13 indicate the directive reflective characteristics of the plate as related to a fixed light source such as the tail light 3. Here the incident ray 12 is reflected in a definite direction different from the direction of the incidence. Colors are, of course, apparent in the reflected beam as all colors but that of the reflecting medium are absorbed, and the optical units are so closely related that transitions in the light-reflecting characteristics of the opaque medium at the rear of the plate appear without observable distortion.

It will, of course, be apparent that the plate will be clearly legible in the daytime. And, the plate will appear the same at night, from light from a source behind the car carrying the plate or from the tail light, as it does in the daytime.

While the lenses 5 and reflecting surfaces 6 may be arranged in various ways, the arrangement on arcs of circles as illustrated and described is preferable from the standpoint of making a mold for forming the plate. With the arrangement described, the mold, with the exception of the lenses and border, can be made in a turning operation. This materially simplifies the making of the mold and the cost thereof.

In Fig. 5 of the drawing, there is illustrated a form of the license plate in which the front surface, having the lenses thereon is protected. The plate 14 is the same as the plate above described. The boarder 15 is flat and elongated forming a flange 16. To the flange 16, a protective sheet 17 of like material is fused. Any dust or road dirt will collect on this plate which is readily cleaned. Preferably, the sheet 17 may be, when fused in place, in contact with the lenses 18 on the plate 14.

With this arrangement various effects may be obtained in various ways. For example the numerals 19, may be painted on the rear surface of the sheet 17. The rear surface of the plate 14 may have aluminum evaporated thereon to enhance its reflective qualities. Additionally by using dyed plastic, transparent color plastic sheets, for the plate 14 or the sheet 17 or both various color contrasts may be obtained between the numerals and the background.

In Fig. 6 of the drawing another form of the license plate is shown. A plate 20 constructed in accordance with the plate 1 has a cover sheet 21 fused to the border 22 thereof at all points except along the bottom. The cover sheet 21 is spaced from the plate 20 an amount to receive an intermediate sheet 23 of a size to be received within the border 22. The plate 23 carries the numerals and other indicia thereon.

In this form the plate 20 has an enlarged or thickened lower edge 24 having a groove 25 therein. The cover sheet 21 also has an enlarged lower edge section 26 having a groove 27 therein opposite the groove 24. The intermediate sheet 23, with the numbers and other indicia thereon is inserted through the slot in the lower edge of the plate, between the plate 20 and the cover sheet 21. When in position, as illustrated a rubber gasket 28 is inserted to engage in the grooves 25 and 27 and close the opening between the plate 20 and the cover sheet 21.

The plate in Fig. 6 is illustrated in conjunction with a metal backing and a supporting plate 29. This plate 29 has an overhanging flange 30 at the upper edge thereof. A clamp 31 engages the lower edge section 26 of the cover sheet 21 and is secured to the plate 29 by bolts such as the bolt 32.

With the plate of Fig. 6, it is only necessary to change the intermediate sheet 23 from year to year. The rear surface of the plate 20 which may be a clear transparent plate may have aluminum evaporated thereon. Likewise, the cover sheet 21 may be clear, that it is colorless. Contrasting colors may be obtained by using a dyed, transparent sheet for the intermediate sheet 23 with the numbers painted thereon. Other arrangements will be obvious.

From the foregoing description of the embodiments of the invention illustrated in the drawings, it will be seen that by this invention there is provided a retrodirective and directive light-reflecting sign. When used as a license plate it renders the license plate clearly legible to pedestrians and approaching drivers of other cars. It also serves as an indicating reflector on a parked car with the lights extinguished.

It will be obvious that various changes may be made by those skilled in the art in the details of the several forms of the invention illustrated in the drawings and described in detail above within the principle and scope of the invention as expressed in the appended claims.

I claim:

1. A light-reflecting device comprising a relatively thin sheet of light transmitting material having one surface thereof formed with a plurality of spaced relatively small light-collecting lenses and plane surfaces intermediate the lenses, and the opposite surface formed with plane surfaces opposite the lenses and prismatic reflectors intermediate the plane surfaces, the thickness of the sheet being such that the plane surface behind a lens is located at the point of greatest concentration of light by the lens from a point source at infinity and the prismatic reflectors being arranged to reflect light falling thereon from a source fixed with respect thereto in a predetermined direction other than retrodirectively.

2. A light-reflecting device comprising a relatively thin sheet of light transmitting material having one surface thereof formed with a plurality of spaced relatively small light-collecting lenses and plane surfaces intermediate the lenses, and the opposite surface formed with plane surfaces opposite the lenses and prismatic reflectors intermediate the plane surfaces, the thickness of the sheet being such that the plane surface behind a lens is located at the point of greatest concentration of light by the lens from a point source at infinity and the prismatic reflectors being arranged to reflect light falling thereon from a source fixed with respect thereto in a predetermined direction other than retrodirectively, the lenses and the prismatic reflectors being uniformly distributed over the sheet and of substantially equal area.

3. A light-reflecting device comprising a relatively thin sheet of transmitting material having one surface formed with a plurality of spaced series of relatively small lenses, the lenses of each series being in contact with adjacent lenses and adjacent series being spaced a distance substantially equal to the diameter of the lens and the opposite surface being formed of alternate plane surfaces and prismatic reflectors, the plane surfaces being opposite the lenses and the prismatic reflectors being opposite the spaces between the lenses and the thickness of the sheet being such that the plane surfaces behind a lens is located at the point of greatest concentration of light by the lens from a point source at infinity and the prismatic reflectors being arranged to reflect light falling thereon from a source fixed with respect thereto in a predetermined direction other than retrodirectively.

4. A light-reflecting device comprising a relatively thin sheet of light-transmitting material having one surface thereof formed with a plurality of spaced, light-collecting lenses of a radius of curvature of less than one thirty-second of an inch and the opposite surface formed with plane surfaces opposite the lenses and prismatic reflectors intermediate the plane surfaces, the thickness of the sheet being such that the plane surfaces behind a lens is located at the point of greatest concentration of light by the lens from a point source at infinity and the prismatic reflectors being arranged to reflect light falling thereon from a source fixed with respect thereto in a predetermined direction other than retrodirectively, and the lenses and prismatic reflectors being uniformly distributed and occupying substantially equal areas.

5. A light-reflecting device comprising a relatively thin sheet of light-transmitting material having one surface thereof formed with a plurality of spaced, light-collecting lenses and the opposite surface formed with plane surfaces opposite the lenses and prismatic reflecting surfaces intermediate the plane surfaces, the curvature of the lenses, thickness of the sheet from the apex of the lenses to the plane surface behind the lenses and the index of refraction of the material being optically related as three one hundred and twenty-eighths of an inch, fifty-six thousandths of an inch and one and six-tenths, and the prismatic reflectors being arranged to reflect light falling thereon from a source fixed with respect thereto in a predetermined direction other than retrodirectively, and the lenses and prismatic reflectors being uniformly distributed and occupying substantially equal areas.

RICHARD W. LUCE.

REFERENCES CITED

The following references are of record in the file of this patent:

UNITED STATES PATENTS

| Number | Name | Date |
|---|---|---|
| 2,167,149 | Grote | July 25, 1939 |
| 2,102,975 | Rolph | Dec. 21, 1937 |
| 2,143,946 | Hunter | Jan. 17, 1939 |
| 2,036,146 | Kampfer | Mar. 31, 1936 |
| 2,054,289 | Jackson | Sept. 15, 1936 |
| 2,310,790 | Jungerson | Feb. 9, 1943 |
| 1,535,985 | Clark | Apr. 28, 1925 |
| 1,858,975 | Ta Bois | May 17, 1932 |
| 2,119,992 | Johnson | June 7, 1938 |
| 1,959,090 | Wood | May 15, 1934 |

FOREIGN PATENTS

| Number | Country | Date |
|---|---|---|
| 511,107 | Germany | Oct. 25, 1930 |
| 456,398 | Great Britain | Nov. 9, 1936 |